(12) United States Patent
Zimmermann

(10) Patent No.: US 10,328,462 B2
(45) Date of Patent: Jun. 25, 2019

(54) ULTRASONIC TRANSDUCER

(71) Applicant: Pepperl+Fuchs GmbH, Mannheim (DE)

(72) Inventor: Stefan Zimmermann, Birkenheide (DE)

(73) Assignee: Pepperl + Fuchs GmbH, Mannheim (DE)

( * ) Notice: Subject to any disclaimer, the term of this patent is extended or adjusted under 35 U.S.C. 154(b) by 86 days.

(21) Appl. No.: 15/830,324

(22) Filed: Dec. 4, 2017

(65) Prior Publication Data

US 2018/0093300 A1    Apr. 5, 2018

Related U.S. Application Data

(63) Continuation of application No. PCT/EP2016/000592, filed on Apr. 11, 2016.

(30) Foreign Application Priority Data

Jun. 3, 2015 (EP) .................................... 15001652

(51) Int. Cl.
*B06B 1/06* (2006.01)
*G01S 7/521* (2006.01)
(Continued)

(52) U.S. Cl.
CPC .......... *B06B 1/0659* (2013.01); *B06B 1/0662* (2013.01); *G01S 7/521* (2013.01);
(Continued)

(58) Field of Classification Search
CPC .......... G01S 7/521; G10K 9/22; G10K 11/32; G10K 9/122; B06B 1/0662; B06B 1/0659; B06B 2201/55
(Continued)

(56) References Cited

U.S. PATENT DOCUMENTS 4,190,783 A    2/1980  Massa
4,368,400 A    1/1983  Taniguchi et al.
(Continued)

FOREIGN PATENT DOCUMENTS

DE    42 15 271 A1    11/1993
DE    296 11 678 U1    8/1997
(Continued)

*Primary Examiner* — Jacques M Saint Surin
(74) *Attorney, Agent, or Firm* — Muncy, Geissler, Olds & Lowe, P.C.

(57) ABSTRACT

An ultrasonic transducer having a transducer element, a housing, a coupling element with a front and a back, wherein the back of the coupling element is acoustically coupled to the top of the transducer element in order to couple the ultrasonic waves generated by the transducer element out to the environment in a transmit mode or in order to pass the ultrasonic waves received from the environment by the coupling element on to the transducer element in a receive mode. The transducer element and the coupling element are arranged in the housing. A first electrode is connected to a contact area formed on the bottom of the transducer element. The transducer element is arranged in a shielding device made of a metallically conductive material, and the opening of the shielding device is covered by a metallic, conductive screen so that the shielding device and the screen form a Faraday cage.

14 Claims, 1 Drawing Sheet

(51) Int. Cl.
*G10K 9/22* (2006.01)
*G10K 11/32* (2006.01)
*G10K 9/122* (2006.01)

(52) U.S. Cl.
CPC ............... *G10K 9/22* (2013.01); *G10K 11/32* (2013.01); *B06B 2201/55* (2013.01); *G10K 9/122* (2013.01)

(58) Field of Classification Search
USPC .......................................................... 73/632
See application file for complete search history.

(56) References Cited

U.S. PATENT DOCUMENTS

| | | | |
|---|---|---|---|
| 4,434,384 A * | 2/1984 | Dunnrowicz | B06B 1/0622 310/325 |
| 7,688,681 B2 * | 3/2010 | Weber | G10K 11/004 367/165 |
| 8,627,729 B2 | 1/2014 | Mueller et al. | |
| 9,505,031 B2 * | 11/2016 | Wilt | B06B 1/06 |
| 2003/0107302 A1 | 6/2003 | Birth et al. | |
| 2009/0230822 A1 * | 9/2009 | Kushculey | A61N 7/02 310/366 |
| 2010/0231093 A1 | 9/2010 | Li | |
| 2015/0042206 A1 * | 2/2015 | Nguyen | H01L 41/08 310/311 |
| 2018/0140278 A1 * | 5/2018 | Bromberg | A61B 8/4494 |

FOREIGN PATENT DOCUMENTS

| | | |
|---|---|---|
| DE | 10 2007 062 460 A1 | 6/2009 |
| DE | 10 2008 055 116 A1 | 7/2010 |
| EP | 1 282 174 A2 | 2/2003 |

* cited by examiner

ULTRASONIC TRANSDUCER

This nonprovisional application is a continuation of International Application No. PCT/EP2016/000592, which was filed on Apr. 11, 2016, and which claims priority to European Patent Application No. 15001652.5, which was filed in Europe on Jun. 3, 2015, and which are both herein incorporated by reference.

BACKGROUND OF THE INVENTION

Field of the Invention

The invention relates to an ultrasonic transducer.

Description of the Background Art

An ultrasonic transducer with a housing and with a transducer element and a coupling element is known from DE 10 2008 055 116 A1, which corresponds to U.S. Pat. No. 8,627,729. In addition, an ultrasonic sensor is known from DE 10 2007 062 460 A1.

SUMMARY OF THE INVENTION

It is therefore an object of the invention to provide a device that advances the state of the art.

According to an exemplary embodiment of the invention an ultrasonic transducer is provided, having a piezoelectric transducer element with a top and a bottom, and further having a cup-shaped housing with a top and a nearly closed bottom, or a cylindrical housing with a substantially open bottom, wherein an opening is formed at the top, and having a coupling element with a front and a back, wherein the back of the coupling element is acoustically coupled to the top of the transducer element in order to couple the ultrasonic waves generated by means of the transducer element out to the environment in a transmit mode or in order to pass the ultrasonic waves received from the environment by the coupling element on to the transducer element in a receive mode.

In addition, the transducer element and the coupling element can be arranged in the housing, and the ultrasonic transducer has a first electrode and a second electrode, wherein the first electrode is connected to a contact area formed on the bottom of the transducer element, and wherein the transducer element is arranged in a cup-like shielding device made of a metallically conductive material, and the opening of the shielding device is covered by a metallic, conductive screen so that the shielding device and the screen form a Faraday cage, and the screen is implemented between the top of the transducer element and the back of the coupling element, and a gap is formed between the housing and the shielding device, and the housing is acoustically decoupled from the shielding device.

The transducer element can be arranged completely inside the Faraday cage, and the transducer element is strongly acoustically coupled to the coupling element despite the screen in order to achieve high efficiency for the ultrasonic transducer. It is a matter of course that in the transmit mode the coupling element couples generated ultrasonic waves out to the environment, for example air, and in the receive mode passes the received ultrasonic waves on to the transducer element. In the transmit mode, an AC voltage up to several MHz is applied to the transducer element, while in the receive mode the transducer element generates an AC voltage. It is also a matter of course that the Faraday cage is electrically connected to a reference potential, in particular to a ground potential.

The housing can be made of a plastic and/or of a metal, and can also be made in a cylindrical shape. Other shapes, for example, rectangular, are also possible. Also, the designation "nearly closed" on the bottom of the housing refers to a housing bottom that is closed with the exception of the feed-throughs for the terminal contacts. Accordingly, the designation "substantially open" refers to an opening of a cylinder.

Different housing shapes, in particular angular, are also possible for the shielding device as long as the shielding device is tight with respect to electromagnetic waves. Especially when the space between the housing and the Faraday cage can be filled easily from the bottom and from the top during manufacture, for example in the cylindrical embodiment, the ultrasonic transducers can be manufactured easily and reliably.

Previous solutions according to the prior art have shown that inadequate EMI resistance is provided as compared to the present invention, in particular in the case of asymmetric signal coupling. EMI resistance can be substantially improved with the present screen.

The term EMI can be understood herein to mean the resistance to electromagnetic waves. Experiments have demonstrated that the transducer element is efficaciously shielded from the electric fields, even in an HF range above 100 MHz. In particular, an economical and small ultrasonic transducer with high EMI resistance can be produced. Another advantage is that the screen is permeable for an acoustic decoupling material.

In an embodiment, the shielding device and the interstices and the housing are filled with an acoustic decoupling material. In an embodiment, all cavities can be completely filled, and in particular the gap is completely filled with the decoupling material. For example, elastomeric matrix materials with at least one filler, in particular gas bubbles, can be used as decoupling materials. For example, the Shore A hardness is less than 25.

In an embodiment, the transducer element can have a smaller diameter than the shielding device. In particular, the transducer element is implemented as a flat, cylindrical piezo element, wherein the top and/or the bottom are each implemented as planar surfaces.

In an embodiment, the top edge of the housing and the surface of the coupling element and the surface of the decoupling material form a common planar surface. The individual parts can be made fluid-tight at the surface.

In an embodiment, the screen can be fastened to the shielding device using a fastener, a clamping ring, etc. It is a matter of course that other electrically conductive and HF-tight fasteners are also suitable. The clamping ring can be made of a metal. It is a matter of course that in another embodiment the fastener also includes soldering or welding points. In an embodiment, the shielding device and/or the screen are each made of a metal as well. It is preferred to electrically connect the screen to the top of the transducer element, and in particular to electrically connect the second electrode to the Faraday cage, so that the top of the transducer element and the Faraday cage are clamped at a common reference potential. It is a matter of course that the second electrode is connected to the cage with low resistance for this purpose. In particular, the shielding device has a contact region on the bottom, wherein the second electrode is electrically connected to the contact region.

In an embodiment, the first electrode and/or the second electrode is passed through the housing, for example, at the bottom of the housing.

In an embodiment, the thickness of the mesh sections of the screen can be 40 µm, but at least 5 µm and at most 0.75 mm. Moreover, it is preferred that the mesh size of the screen can be 0.4 mm, but at least 0.1 mm and at most 3.0 mm. It is preferred for the screen to be made of bronze or copper.

In another improvement, the gap between the shielding device and the housing is at least 0.5 mm and at most 2.0 cm.

In an embodiment, the transducer element can have an additional contact area. In this case, the second electrode is connected to the contact area, and the shielding device and the screen are implemented to be electrically insulated from the transducer element. The shielding device is clamped at a reference potential by means of a third electrode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
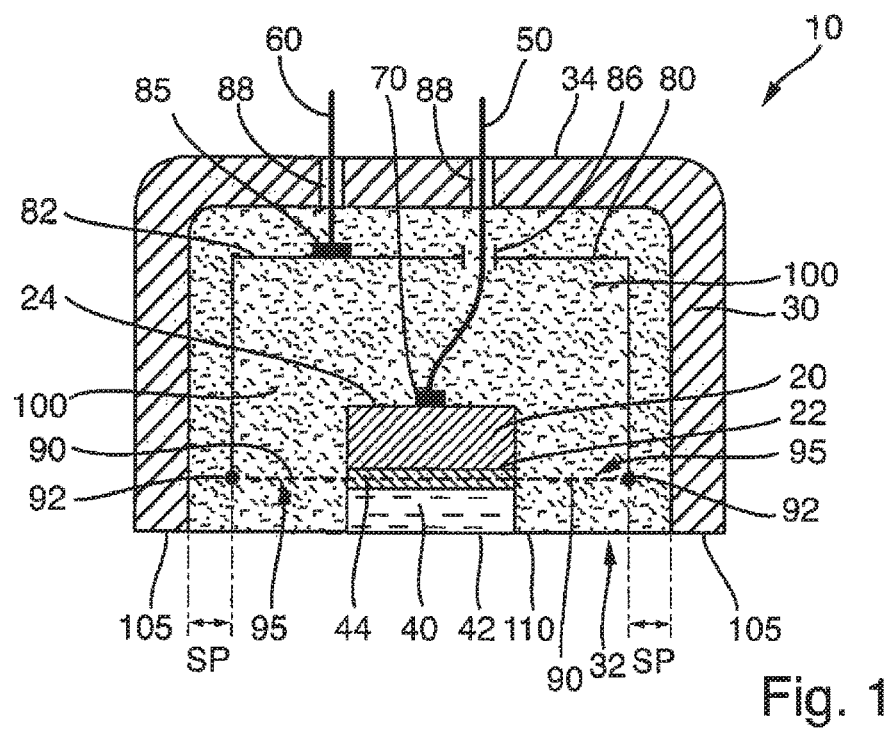
FIG. 1 shows a cross-sectional view of an embodiment of an ultrasonic transducer.

The illustration in FIG. 1 shows a cross-sectional view of a first embodiment of an ultrasonic transducer 10 with a piezoelectric transducer element 20 with a top 22 and a bottom 24. The ultrasonic transducer 10 has a cup-shaped housing 30 with a top 32 and a bottom 34, wherein an opening is formed at the top 32 of the housing 30. The housing 30 can be made of plastic. In an alternative embodiment that is not shown, the housing 30 is made in a cylindrical shape. In this case, the housing has a material that is at least partially different on the bottom than on the side of the housing. In particular, if the bottom 34 is open, a space between the housing 30 and the Faraday cage can be filled easily from the top 32 and from the bottom 34.

In addition, the ultrasonic transducer 10 has a coupling element 40 with a front 42 and a back 44, wherein the back 44 of the coupling element 40 is acoustically coupled to the top 22 of the transducer element 20 in order to couple the ultrasonic waves generated by means of the transducer element 20 out to the environment in a transmit mode or in order to pass the ultrasonic waves received from the environment by the coupling element 40 on to the transducer element 20 in a receive mode. The transducer element 20 and the coupling element 40 are arranged in the housing 30.

Moreover, the ultrasonic transducer 10 has a first electrode 50 and a second electrode 60, wherein the first electrode 50 is connected to a contact area 70 formed on the bottom 24 of the transducer element 20. The transducer element 20 is arranged in a cup-like shielding device 80 made of a metallically conductive material, wherein the opening of the shielding device 80 is covered by a metallic, conductive screen 90. In the present case, the screen 90 is fastened to the shielding device 80 using a fastener, for example, a clamping ring 92. The screen 90 has a plurality of interstices 95. The term interstice 95 refers to the clear opening between the meshes of the screen 90.

In the present case, the shielding device 80 is recessed in the housing 30 by the thickness of the coupling element 40. The screen 90 is electrically connected to the top of the transducer element 20. The shielding device 80 and the screen 90 form a Faraday cage, wherein the screen 90 is implemented between the top 22 of the transducer element 20 and the back 44 of the coupling element 40.

Furthermore, the second electrode 60 is connected to the Faraday cage, in the present case to a contact region 85 on the bottom 82 of the cup-like shielding device 80, so that the top 22 of the transducer element 20 and the Faraday cage are clamped at a ground potential. The shielding device 80 has a feed-through 86 on the bottom 82. The first electrode 50 is routed through the feed-through 86 such that it is electrically insulated with respect to the shielding device 80. On the bottom 34, the housing 30 has two feed-throughs 88 for the two electrodes 50 and 60, which is to say that the first electrode 50 and the second electrode 60 are passed through the housing 30 at the bottom 34.

Between the housing 30 and the shielding device 80, a gap SP is formed, so that the housing 30 is acoustically decoupled from the shielding device 80. The transducer element 20 and the coupling element 40 have a smaller diameter than the shielding device 80. The two elements 20 and 40 can have an identical diameter. The shielding device 80 as well as the interstices 95 are filled with an acoustic decoupling material 100, in particular an elastomeric foam.

Taken as a whole, the top edge surface 105 of the housing 30 and the front 42 of the coupling element 40 and the surface of the decoupling material 100 form a common planar surface 110.

Figure 2:
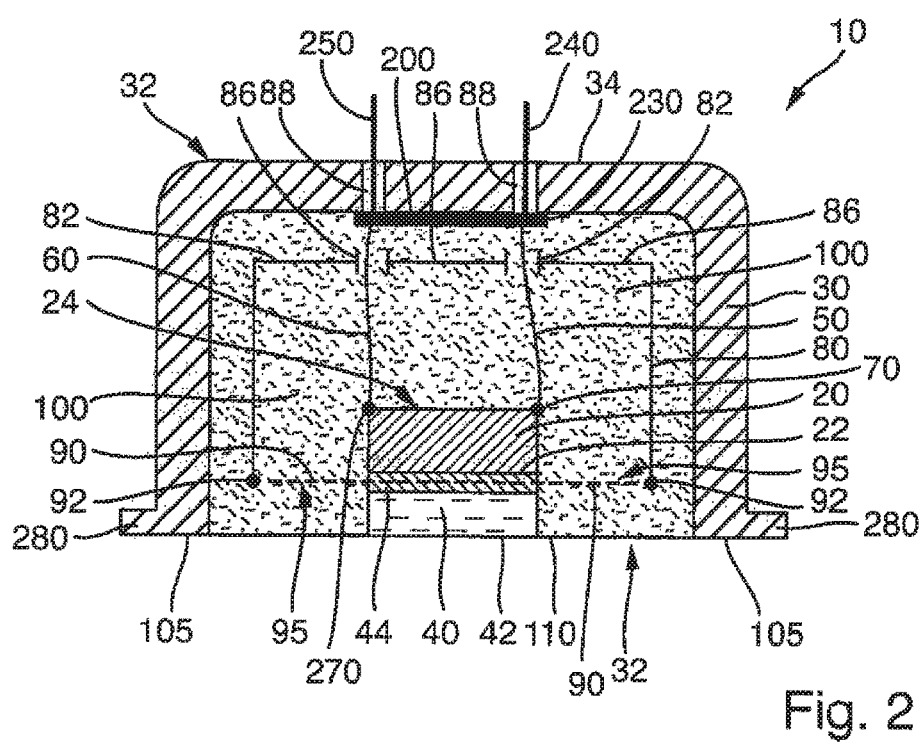
FIG. 2 shows a cross-sectional view of an embodiment of an ultrasonic transducer.

In the illustration in FIG. 2, a second embodiment of an ultrasonic transducer 10 is shown in a cross-sectional view. Only the differences from the embodiment shown in the illustration in FIG. 1 are explained below. The transducer element 20 has a second contact area 270. The second electrode 60 is connected to the second contact area 270. Furthermore, the shielding device 80 has an additional feed-through 86 on the bottom 82.

The second electrode 60 is routed through the additional feed-through 86 such that it is electrically insulated with respect to the shielding device 80. The two electrodes 50 and 60, which can be comprised of a flexible wire, end at a printed circuit board 230. The printed circuit board 230 is implemented on the inside of the housing 30 between the shielding device 80 and the housing floor 200. The printed circuit board 230 includes a first contact pin 240 and a second contact pin 250, wherein the two contact pins 240 and 250 are routed through the two feed-throughs 88 on the housing 30. The housing 30 has a shoulder 280 connected to the edge surface 105.

In contrast to the first embodiment shown in FIG. 1, in which the second electrode 60 is connected to the transducer element 20 by means of the screen 90 and causes the signal to be coupled out asymmetrically in that the connection to the Faraday cage is clamped at a reference potential, in the present embodiment from FIG. 2 the second electrode 60 is connected directly to the transducer element 20 in the embodiment shown in the illustration in FIG. 2. Because neither of the two electrodes 50 and 60 is clamped at a ground potential, the signal can now be coupled out symmetrically. If the screen 90 is not electrically connected to the transducer element 20, the screen 90 can be clamped at a reference potential. An AC signal present between the first electrode and the second electrode would be free from a reference potential.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An ultrasonic transducer comprising:
   a piezoelectric transducer element with a top and a bottom;
   a cup-shaped housing with a top and a nearly closed bottom, or a cylindrical housing with an open bottom, wherein an opening is formed at the top;
   an acoustic decoupling material arranged between the transducer element and the bottom of the housing
   a coupling element with a front and a back, wherein the back of the coupling element is acoustically coupled to the top of the transducer element to couple ultrasonic waves generated via the transducer element out to an external environment in a transmit mode or to pass the ultrasonic waves received from the external environment by the coupling element to the transducer element in a receive mode, the transducer element and the coupling element being arranged in the housing;
   a first electrode and a second electrode, the first electrode being connected to a contact area formed on the bottom of the transducer element;
   a cup-like shielding device made of a metallically conductive material, the transducer element being arranged in the cup-like shielding device; and
   a metallic conductive screen covering an opening of the shielding device so that the shielding device and the screen form a Faraday cage,
   wherein a gap is formed between the housing and the shielding device,
   wherein the housing is acoustically decoupled from the shielding device,
   wherein the screen is arranged between the top of the transducer element and the back of the coupling element,
   wherein the transducer element is spaced apart from the bottom of the housing, and
   wherein the coupling element has a smaller diameter than the shielding device so that the acoustic decoupling material is arranged between the housing and the coupling element.

2. The ultrasonic transducer according to claim 1, wherein the shielding device and the interstices and the housing are filled with the acoustic decoupling material.

3. The ultrasonic transducer according to claim 1, wherein the transducer element has a smaller diameter than the shielding device.

4. The ultrasonic transducer according to claim 1, wherein a top edge of the housing and a surface of the coupling element and a surface of the decoupling material form a common planar surface.

5. The ultrasonic transducer according to claim 1, wherein the screen is fastened to the shielding device using a fastener or a clamping ring.

6. The ultrasonic transducer according to claim 1, wherein the shielding device and/or the screen are made of a metal.

7. The ultrasonic transducer according to claim 1, wherein the screen is electrically connected to the top of the transducer element and the second electrode is connected to the Faraday cage so that the top of the transducer element and the Faraday cage are clamped at a common reference potential.

8. The ultrasonic transducer according to claim 1, wherein the first electrode and/or the second electrode is passed through the housing.

9. The ultrasonic transducer according to claim 1, wherein the shielding device has a contact region on the bottom, and the second electrode is electrically connected to the contact region.

10. The ultrasonic transducer according to claim 1, wherein the thickness of the mesh sections of the screen is at least 5 μm and at most 0.75 mm.

11. The ultrasonic transducer according to claim 1, wherein the mesh size of the screen is at least 0.1 mm and at most 3.0 mm.

12. The ultrasonic transducer according to claim 1, wherein the gap between the shielding device and the housing is at least 0.5 mm.

13. The ultrasonic transducer according to claim 1, wherein the screen is made of bronze or copper.

14. The ultrasonic transducer according to claim 1, wherein the transducer element has an additional contact area, wherein the second electrode is connected to the contact area, wherein the shielding device and the screen are electrically insulated from the transducer element, and wherein the shielding device is clamped at a reference potential via a third electrode.

* * * * *